US012683945B2

(12) United States Patent
Bralley et al.

(10) Patent No.: US 12,683,945 B2
(45) Date of Patent: Jul. 14, 2026

(54) JOINING END-TO-END ENCRYPTED ONLINE CONFERENCES USING CACHED USER CREDENTIALS

(71) Applicant: Cisco Technology, Inc., San Jose, CA (US)

(72) Inventors: Brett Louise Bralley, Los Angeles, CA (US); Richard Lee Barnes, Arlington, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 26 days.

(21) Appl. No.: 18/797,825

(22) Filed: Aug. 8, 2024

(65) Prior Publication Data

US 2026/0046279 A1    Feb. 12, 2026

(51) Int. Cl.
*H04L 9/40* (2022.01)
*H04L 12/18* (2006.01)
*H04L 65/403* (2022.01)

(52) U.S. Cl.
CPC .......... *H04L 63/08* (2013.01); *H04L 12/1822* (2013.01); *H04L 12/1831* (2013.01); *H04L 65/403* (2013.01)

(58) Field of Classification Search
CPC ... H04L 65/403; H04L 63/08; H04L 12/1822; H04L 12/1831
See application file for complete search history.

(56) References Cited

U.S. PATENT DOCUMENTS

| | | | |
|---|---|---|---|
| 10,218,638 B2 * | 2/2019 | Chen ....................... | H04L 49/20 |
| 2015/0089608 A1 * | 3/2015 | Nandyala ................ | H04L 63/20 |
| | | | 726/6 |
| 2015/0254441 A1 * | 9/2015 | Sanso .................... | G06F 21/41 |
| | | | 726/9 |
| 2016/0234209 A1 * | 8/2016 | Kahol ................... | G06F 21/305 |
| 2017/0316383 A1 | 11/2017 | Naganathan et al. | |

(Continued)

OTHER PUBLICATIONS

Barnes R., et al., "Additional MLS Credentials", Messaging Layer Security, draft-barnes-mls-addl-creds-01, Informational, Mar. 4, 2024, 11 Pages.

(Continued)

*Primary Examiner* — Thomas J Dailey
(74) *Attorney, Agent, or Firm* — Edell, Shapiro & Finnan, LLC

(57) ABSTRACT
Provided herein are techniques to facilitate joining an End-to-End Encrypted (E2EE) online conference by a conference client using cached credentials. In one example, a method may include storing, by a conference client of a first user, a cached list of user credentials for one or more other users for previous online conferences in which the first user has participated. For a particular online conference to which the first user seeks to join, the method may further include determining whether particular user credentials for particular users participating in the particular online conference are not included in the cached list of user credential. Based on determining that at least one particular user credential is not included in the cached list of user credentials, the method may include obtaining the at least one particular user credential to enable the first user, via the conference client, to join the particular online conference.

20 Claims, 12 Drawing Sheets

(56) References Cited

U.S. PATENT DOCUMENTS

| | | | |
|---|---|---|---|
| 2018/0091620 | A1 | 3/2018 | Singh et al. |
| 2018/0351757 | A1 | 12/2018 | Reddy et al. |
| 2020/0274726 | A1* | 8/2020 | Setteboun .......... G06Q 10/1093 |
| 2021/0374685 | A1 | 12/2021 | Rosenberg |
| 2022/0224693 | A1* | 7/2022 | Broadworth .......... H04L 63/101 |
| 2022/0377080 | A1 | 11/2022 | Lyons |
| 2023/0127695 | A1* | 4/2023 | Woo ...................... H04L 63/108 |
| | | | 726/4 |

OTHER PUBLICATIONS

Barnes R., et al., "RFC 9420 The Messaging Layer Security (MLS) Protocol", Internet Engineering Task Force (IETF), Standards Track, Jul. 2023, pp. 1-132.

Beurdouche B., et al., "The Messaging Layer Security (MLS) Architecture", Network Working Group, draft-ietf-mls- architecture-13, Informational, Mar. 22, 2024, 46 Pages.

Cooper D., et al., "Internet X.509 Public Key Infrastructure Certificate and Certificate Revocation List (CRL) Profile", Network Working Group, Request for Comments: 5280, Obsoletes: 3280, 4325, 4630, Standards Track, May 2008, pp. 1-151.

Fluhrer S., et al., "RFC 8784 Mixing Preshared Keys in the Internet Key Exchange Protocol Version 2 (IKEv2) for Post-quantum Security", Internet Engineering Task Force (IETF), Standards Track, Jun. 2020, pp. 1-16.

Ghedini A., et al., "RFC 8879 TLS Certificate Compression", Internet Engineering Task Force (IETF), Standards Track, Dec. 2020, pp. 1-8.

Housley R., et al., "RFC 9257 Guidance for External Pre-Shared Key (PSK) Usage in TLS", Internet Engineering Task Force (IETF), Informational, Jul. 2022, pp. 1-13.

IBM: "Compression Dictionaries", IBM Documentation, Informix Servers 12.10, Retrieved from https://www.ibm.com/docs/en/informix-servers/12.10?topic=compression-dictionaries, last updated on Mar. 15, 2023, 1 page.

Kiefer F., et al., "Light Clients for MLS", Network Working Group, draft-kiefer-mls-light-00, Informational, Mar. 4, 2024, 16 Pages.

Migault D., et al., "RFC 9527 DHCPv6 Options for the Homenet Naming Authority", Internet Engineering Task Force (IETF), Standards Track, Jan. 2024, pp. 1-13.

Rescorla E., "The Transport Layer Security (TLS) Protocol Version 1.3", Internet Engineering Task Force (IETF), Request for Comments: 8446, Obsoletes: 5077, 5246, 6961, Standards Track, Aug. 2018, pp. 1-160.

Santesson S., et al., "Transport Layer Security (TLS) Cached Information Extension", Internet Engineering Task Force (IETF), Request for Comments: 7924, Standards Track, Jul. 2016, pp. 1-19.

Wikipedia, "Brotli," The Free Encyclopedia, Retrieved from: https://en.wikipedia.org/wiki/Brotli, on Mar. 13, 2025, 5 pages.

Wikipedia, "Bloom filter," The Free Encyclopedia, Retrieved from: https://en.wikipedia.org/wiki/Bloom_filter, on Mar. 13, 2025, 25 pages.

* cited by examiner

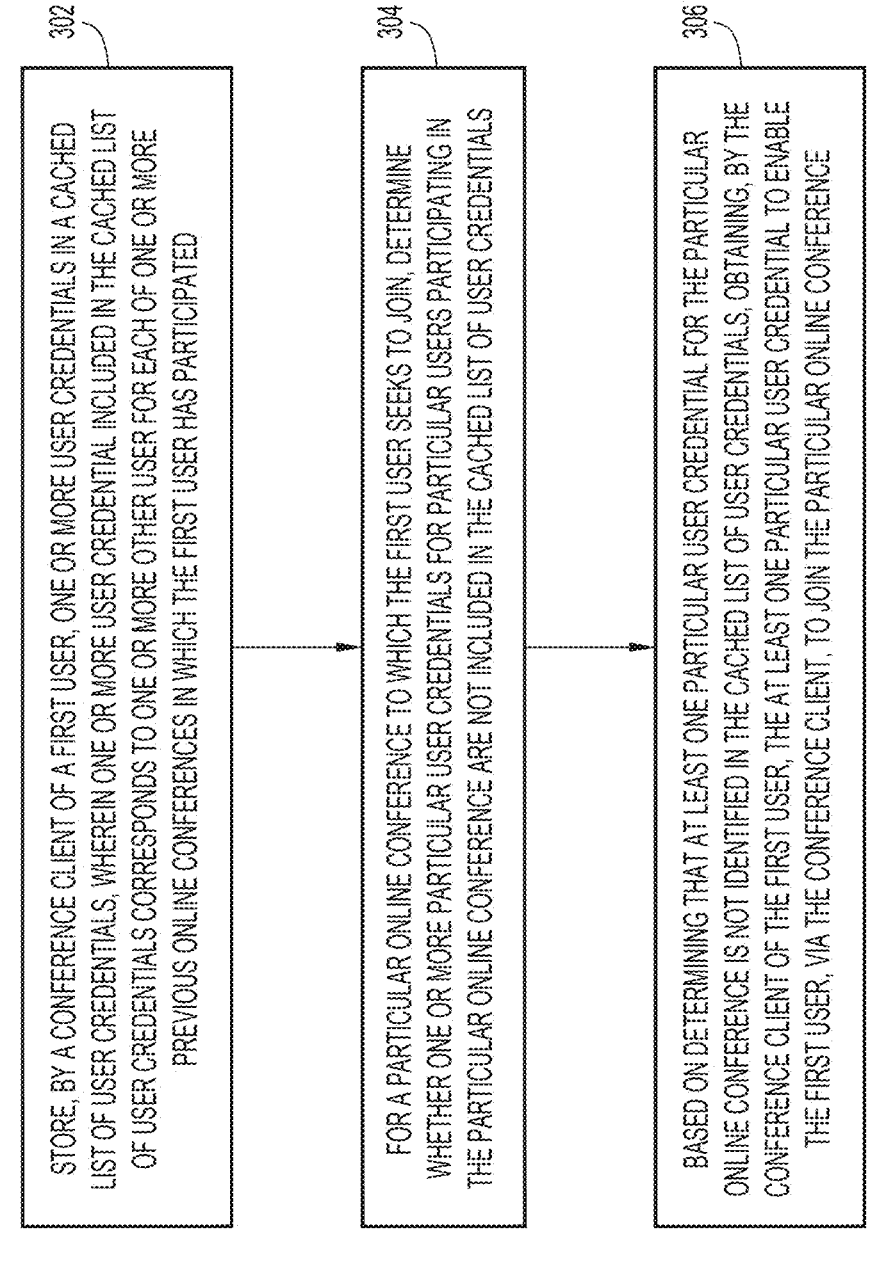

STORE, BY A CONFERENCE CLIENT OF A FIRST USER, ONE OR MORE USER CREDENTIALS IN A CACHED LIST OF USER CREDENTIALS, WHEREIN ONE OR MORE USER CREDENTIAL INCLUDED IN THE CACHED LIST OF USER CREDENTIALS CORRESPONDS TO ONE OR MORE OTHER USER FOR EACH OF ONE OR MORE PREVIOUS ONLINE CONFERENCES IN WHICH THE FIRST USER HAS PARTICIPATED

302

FOR A PARTICULAR ONLINE CONFERENCE TO WHICH THE FIRST USER SEEKS TO JOIN, DETERMINE WHETHER ONE OR MORE PARTICULAR USER CREDENTIALS FOR PARTICULAR USERS PARTICIPATING IN THE PARTICULAR ONLINE CONFERENCE ARE NOT INCLUDED IN THE CACHED LIST OF USER CREDENTIALS

304

BASED ON DETERMINING THAT AT LEAST ONE PARTICULAR USER CREDENTIAL FOR THE PARTICULAR ONLINE CONFERENCE IS NOT IDENTIFIED IN THE CACHED LIST OF USER CREDENTIALS, OBTAINING, BY THE CONFERENCE CLIENT OF THE FIRST USER, THE AT LEAST ONE PARTICULAR USER CREDENTIAL TO ENABLE THE FIRST USER, VIA THE CONFERENCE CLIENT, TO JOIN THE PARTICULAR ONLINE CONFERENCE

COMPUTING DEVICE

716

I/O

CONTROL LOGIC

720

I/O

NEWORK PROCESSOR UNIT(s)

730

I/O

732

714

712

RF TRANSCIEVER(s)

710

BASEBAND PROCESSOR(s) (MODEM(s))

708

STORAGE

706

MEMORY ELEMENT(s)

704

PROCESSOR(s)

702

700

JOINING END-TO-END ENCRYPTED ONLINE CONFERENCES USING CACHED USER CREDENTIALS

TECHNICAL FIELD

The present disclosure relates to network equipment and services for online conferencing environments.

BACKGROUND

Conference calls enable participants or users of two or more computing devices to speak with each other from multiple locations, typically for an online meeting. End-to-End Encryption protects meeting content from being read or tampered with while it is in transit from one user device to another. Generally, joining an End-to-End Encrypted (E2EE) meeting by a meeting participant is slower/takes longer than joining a meeting that is not E2EE because when a given participant joins an E2EE meeting, they have to download credentials of every meeting participant involved in the meeting—even if the given participant has had a previous meeting involving one or more of the other participants in the E2EE meeting. The larger the E2EE meeting (i.e., the more participants in the meeting), the more credential data there is to download, thus, increasing the amount of time involved for joining the E2EE meeting.

BRIEF DESCRIPTION OF THE DRAWINGS

FIG. 3 is a flow chart depicting a method according to an example embodiment.

FIGS. 6C-1 and 6C-2 are diagrams illustrating example details for joining a subsequent E2EE online conference by the conference client of FIG. 6A using a hash and fetch approach, according to an example embodiment.

DETAILED DESCRIPTION

Overview

Figure 1A:
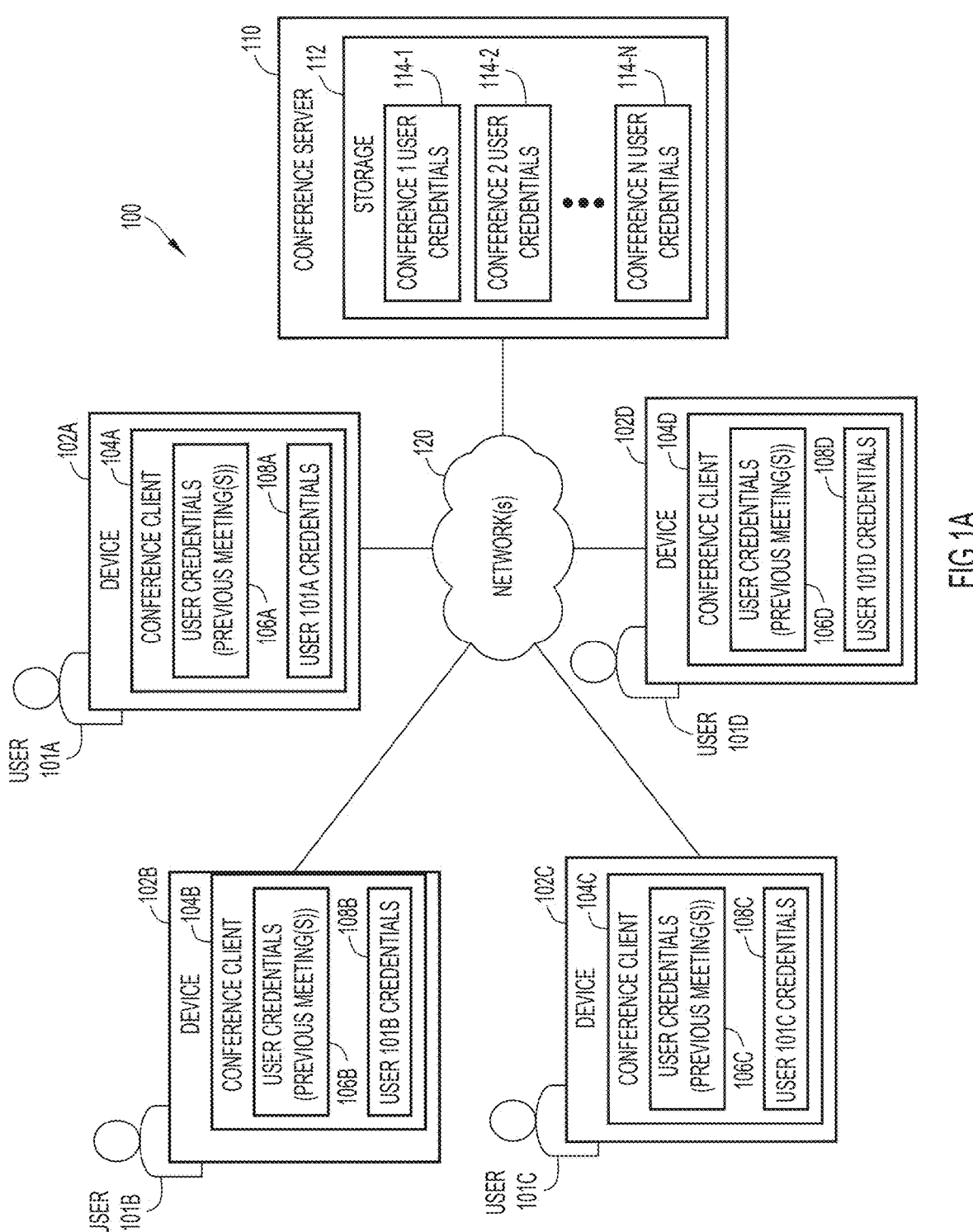
FIG. 1A is a block diagram of a system that may be provided to facilitate joining an End-to-End Encrypted (E2EE) online conference by a conference client of a user using cached user credentials, according to an example embodiment.

Broadly, embodiments herein may provide for entering or joining a Messaging Layer Security (MLS) protocol End-to-End Encrypted (E2EE) online meeting (e.g., an online conference) by a user/conference client operated by the user in a manner that is faster as compared to conventional approaches for joining such E2EE online meetings by utilizing various approaches through which user credentials for previous E2EE online meetings can be cached for use in quickly joining subsequent E2EE online meetings. As referred to herein, the terms online meeting, online conference, conference call, and variations thereof can be used interchangeably.

Users participating in online conferences often meet with many of the same people. Conventional processes for joining an MLS E2EE online meeting involve downloading all the user credentials for all users participating in the MLS E2EE online meeting each time a given user/conference client joins such an MLS E2EE online meeting. However, by exploiting the assumption that users typically meet with the same people across different meetings, embodiments herein provide for the ability to cache user credentials by a given conference client of a user across multiple meetings. In accordance with embodiments herein, a comparison between the cached user credentials stored by a given conference client of a given user to user credentials of participants involved in a given meeting can be used to determine which user credentials are to be obtained by the conference client for a particular subsequent meeting that the given use seeks to join/enter; specifically, the conference client for the given user may obtain only those user credentials that are not currently stored in the cached user credentials maintained by the conference client.

Thus, in accordance with embodiments herein, if the given user joins a particular E2EE online meeting and has met with any of the participants of the particular E2EE online meeting before (in another/previous E2EE online meeting), the user/conference client thereof may have already downloaded the information/user credentials for those people and can reuse such user credentials in the particular E2EE online meeting (and future E2EE online meetings). Such techniques may help to decrease the time spent downloading user credentials in E2EE meetings by a conference client of a given user for scenarios in which the user may repeatedly meet with one or more of the same (other) users.

In at least one embodiment, a computer-implemented method is provided that may include storing, by a conference client of a first user, one or more user credentials in a cached list of user credentials, wherein one or more user credentials included in the cached list of user credentials corresponds to one or more other user for each of one or more previous online conferences in which the first user has participated; for a particular online conference to which the first user seeks to join, determining whether one or more particular user credentials for particular users participating in the particular online conference are not included in the cached list of user credentials; and based on determining that at least one particular user credential for the particular online conference is not identified in the cached list of user credentials, obtaining, by the conference client of the first user, at least one particular user credential to enable the first user, via the conference client, to join the particular online conference.

Example Embodiments

Referring to FIG. 1A, FIG. 1A is a block diagram of a system 100 that may be provided to facilitate joining an End-to-End Encrypted (E2EE) online conference by a conference client of a user using cached user credentials, according to an example embodiment. In at least one embodiment, system 100 may include a number of users, 101A, 101B, 101C, and 101D in which each respective user 101A, 101B, 101C, and 101D operates respective devices 102A, 102B, 102C, and 102D that can be used for participating in an online conference call that includes the users. System 100 may further include a conference server 110 and one or more networks 120.

Each device 102A, 102B, 102C, and 102D may interface with the conference server via the networks 120. The networks 120 may include any combination of wired (e.g., Ethernet) and/or wireless (e.g., wireless local area network, such as Wi-Fi, and/or wireless wide area network, such as a Third Generation Partnership Project (3GPP) 4G, 5G, etc. cellular network). In some instances, the networks 120 may be inclusive of the public Internet, a private network (e.g., an enterprise network), and/or any combination thereof.

Each respective device 102A, 102B, 102C, and 102D can be configured with a respective conference client 104A, 104B, 104C, and 104D that may be implemented as a conferencing application, logic, and/or the like that can be utilized to join/perform a conference call facilitated by conference server 110, which may manage, control, or otherwise 'host' the conference call between/among the devices 102A, 102B, 102C, and 102D. The conference server 110 may include storage 112 that can be used to store per-meeting user credentials for each of one or more conference calls/meetings hosted by the conference server. The conference server 110 may also be referred to as a conference bridge server. More than one conference server may be involved to support one or more conference calls.

In accordance with embodiments herein, each respective conference client 104A, 104B, 104C, and 104D can be configured to store/maintain/cache a respective list of user credentials, 106A, 106B, 106C, and 106D in which each respective list may include user credentials of other participants/users for other (previous) meetings/conference calls in which each user (101A, 101B, 101C, and 101D) has participated.

In some embodiments, one or more user credentials in the list of user credentials cached for a given client may be filled with credentials of one or more other users outside of the context of one or more previous meetings attended by the given user. In at least one embodiment, one or more user credentials stored in the list of user credentials cached for a given client can be pre-filled by/using an external process, that is, external to a meeting involving the given user based on one or more user's that are already 'known' to the given user. In at least one embodiment, the external process can include pre-filling the cache with one or more user credentials of corresponding users that are identified in a contact list of known users maintained for the given user (e.g., by the conference client of the given user). In at least one embodiment, the external process can include selecting user credentials to add to the cached list based on at least one other user being identified as a member of an organization of interest (e.g., the company of the given user, a department within a company, a club, etc.). Other variations can be envisioned for storing on or more user credentials (of other users) in the cached list of user credentials of the client of a given user.

As also shown in FIG. 1A, each conference client 104A, 104B, 104C, and 104D can also store a corresponding user credential for each corresponding user 101A, 101B, 101C, and 101D. For example, conference client 104A can store a user 101A credential 108A for user 101A, conference client 104B can store a user 101B credential 108B for user 101B, conference client 104C can store a user 101C credential 108C for user 101C, and conference client 104D can store a user 101D credential 108D for user 101D.

As referred to herein, user credentials for a given user/participant of a given conference call/meeting may include, in at least one embodiment, a certificate of the given user, that may include, among other information, a user name, user domain information, and/or any other identifying information for the given user, public key information, certificate authority (CA) signing information, and/or the like in which the user credentials can be used to indicate/determine the authenticity of a given user/conference client of the user that seeks to join an MLS E2EE meeting. Other credentials, such as security credentials can be used to join an MLS E2EE meeting. In various instances, the user credentials may be formatted as prescribed by the X.509 public key infrastructure (PKI) standard as defined at least by Internet Engineering Task Force (IETF) Request For Comments (RFC) 5280, RFC 9420, and other similar credential standards. In some embodiments, user credentials may include a Verifiable Credential, as prescribed at least by "Additional MLS Credentials", Internet-Draft "draft-barnes-mls-addl-creds-01, published Mar. 4, 2024. In some embodiments, user credentials may be a compound of multiple certificates.

As noted above, the conference server 110 may include storage 112 that can be used to store per-meeting user credentials for each of one or more conference calls/meetings hosted by the conference server. For example, conference 1 user credentials 114-1 can be stored for a first conference call involving a number of users/conference clients, conference 2 user credentials 114-2 can be stored for a second conference call involving another number of users/conference clients, and so on for an 'N' number of meeting (e.g., shown in FIG. 1A as conference N user credentials 114-N).

Per RFC 9420, per-conference user credentials stored by the conference server 110 can be stored in a format referred to as a ratchet tree in which, for a given E2EE conference call, a ratchet tree including user credentials for the given E2EE conference call can be sent to each conference client of each user participating in the call.

Figure 1B:
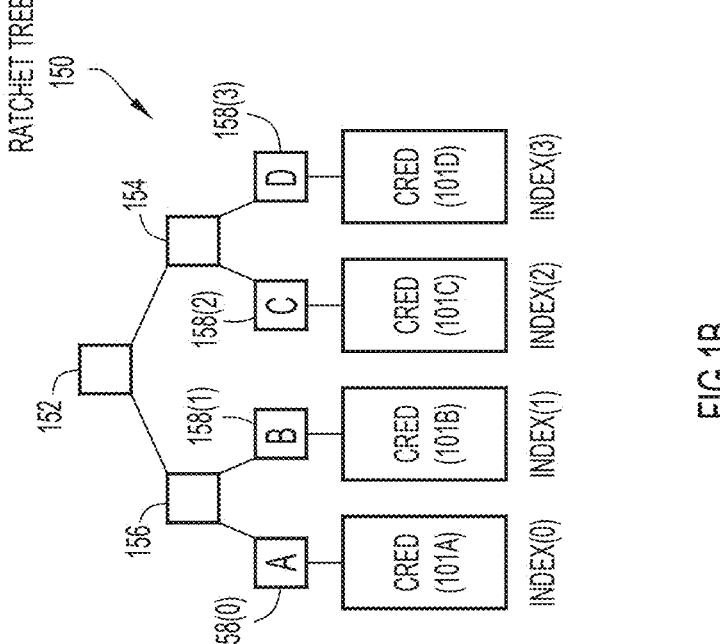
FIG. 1B is a block diagram of an example ratchet tree including user credentials that can be stored for an E2EE online conference, according to an example embodiment.

FIG. 1B illustrates an example ratchet tree 150 that may be used by the conference server 110 to store/manage user credentials for each of users 101A, 101B, 101C, and 101D that may, for example, participate in a first conference call with each other via the users' respective conference clients 104A, 104B, 104C, and 104D. For example, ratchet tree 150 may be stored via conference 1 user credentials 114-1, in one instance.

As defined per RFC 9420, Section 4, the structure of a ratchet tree may include a number of nodes in which a node may be considered a leaf if it has no child nodes and otherwise may be considered a parent. A node is considered to be a root node if it has no parent and may be considered to be an intermediate node if it has both at least one child and a parent. For example, as shown in FIG. 1B, ratchet tree 150 may include a root node 152, a left intermediate node 154 and a right intermediate node 156.

Each leaf node of a ratchet tree contains user credentials for a given user participating in a given conference call/meeting and each leaf node is given an index value, starting from 0 for the left-most left node and incrementing by one index value toward the right-most leaf node. For example, as shown in FIG. 1B, an index value of 0 can be assigned to a leaf node 158(0) that contains credentials for user 101A, an index value of 1 can be assigned to a leaf node 158(1) that contains credentials for user 101B, an index value of 2 can be assigned to a leaf node 158(2) that contains credentials for user 101C, and an index value of 3 can be assigned to a lead node 158(3) that contains credentials for user 101D. In some instances, some leaf nodes might be 'blank' for a given tree, occupied by no user; for example, if a user at a given leaf was removed from the group, say, by leaving the meeting.

The conference server 110 can calculate a hash of each the user credentials stored for each of user 101A, 101B, 101C, and 101D. In some embodiments, a given collaboration client of a given user can calculate a corresponding hash for each corresponding user credential cached by the client. For example, the hash of a given user credential can be calculated based on the data structure of the credential, such as based on fields/data of a user certificate as stored in an MLS data structure by a given client/the conference server 110. In at least one embodiment, the hash can be calculated using a standard hash algorithm, such as Secure Hash Algorithm 256 (SHA-256) or the like.

Broadly, during operation of system 100, each user may utilize a corresponding conference client to connect to an online conference/conference call/meeting. In each online conference/conference call/meeting, the conference server 110 can facilitate an MLS negotiation among conference clients in the meeting, including facilitating user credential download by the clients, as/if needed, in accordance with embodiments herein, in order to provide an E2EE conference call/meeting between the users/conference clients.

The conference clients can maintain a cache of user credentials they have seen/obtained (via ratchet trees) for past E2EE online conferences/conference calls/meetings such that each conference client may obtain only those user credentials for certain participants in a given meeting that are not identified in the cached user credentials maintained by each conference client.

Figure 2:
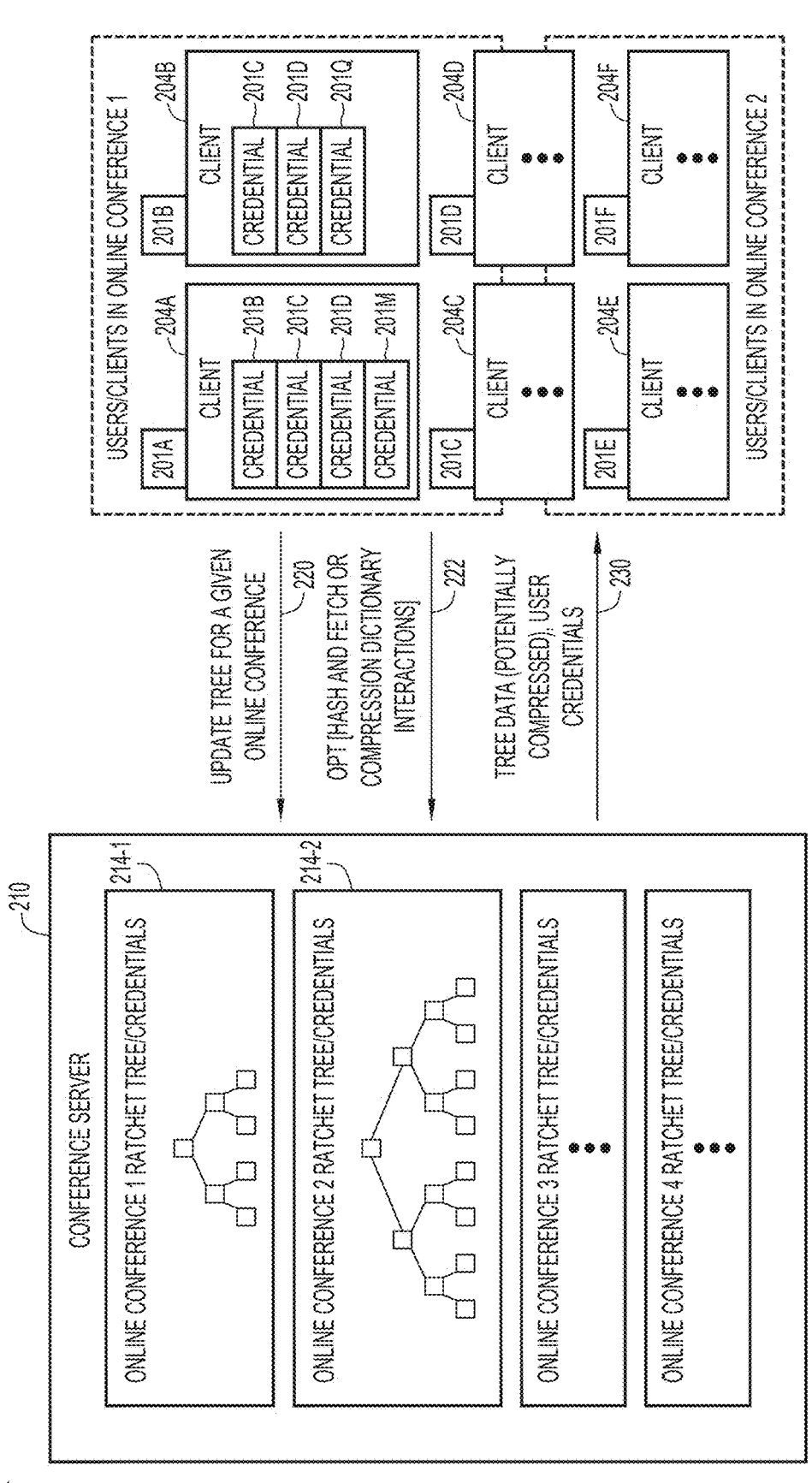
FIG. 2 is a diagram depicting example details for joining an E2EE online conference by conference clients using cached user credentials, according to an example embodiment.

For example, FIG. 2 is a simplified block diagram 200 illustrating broad operations that can be performed by a conference server 210 and a number of conference clients 204A, 204B, 204C, 204D, 204E, and 204F in accordance with embodiments herein in order to facilitate joining an E2EE online conference. Devices of the users upon which the conference clients can operate are not shown in FIG. 2 for purposes of brevity only in order to illustrate various features associated with embodiments herein.

In accordance with embodiments herein, a given conference client of a given user can cache user credentials in a cached list of user credentials in which each user credential included in the cached list of user credentials corresponds to each of one or more other users for each of one or more previous online conferences in which the given user has previously participated.

For example, as shown in FIG. 2 consider that conference client 204A of a user 201A can maintain a cached list of user credentials for other users for previous online conference(s) in which the user 201A has previously participated, such as user credentials for a user 201B (credential(201B)), user credentials for a user 201C (credential(201C)), user credentials for a user 201D (credential(210D)), and user credentials for a user 201M (credential(201M)). Although not shown in FIG. 2, it is to be understood that client 204A can also store a credential for user 201A.

Similarly, conference client 204B of a user 201B can maintain a cached list of user credentials for other users for previous online conference(s) in which the user 201B has previously participated, such as user credentials for user 201C (credential(201C)), user credentials for user 201D (credential(201D)), and user credentials for a user 201Q (credential(201Q)). Although not shown in FIG. 2, it is to be understood that client 204B can also store a credential for user 201B. Although not shown in FIG. 2, it is to be understood that each of corresponding conference clients 204C, 204D, 204E, and 204F can maintain their own corresponding cached list of user credentials in a similar manner as discussed for conference clients 204A and 204B, as well as for their own respective user credentials for each of respective users 201C, 201D, 201E, and 201F.

Further as shown in FIG. 2, the conference server 210 can maintain, for each of a number of online conferences, a corresponding ratchet tree and user credentials for each of the users participating in a given online conference.

In accordance with embodiments herein, for a particular online conference to which a given user seeks to enter or join, operations may include determining whether one or more particular user credentials for particular users participating in the particular online conference are not included in the cached list of user credentials maintained by the conference client of the given user and, based on determining that at least one particular user credential for the particular online conference is not identified in the cached list of user credentials, obtaining, by the conference client of the given user, the at least one particular user credential in order to enable the given user, via the conference client, to join the particular online conference.

For example, consider for FIG. 2 that users 201A, 201B, 201C, and 201C seek to enter or join a first online conference (online conference 1) hosted by the conference server 210. As generally shown at 220, each corresponding conference client 204A, 204B, 204C, and 204D can send the corresponding user credentials of the corresponding users 201A, 201B, 201C, and 201D to the conference server 210, which can develop a ratchet tree 214-1 that includes the user credentials of each of the users.

In accordance with embodiments herein, two approaches or variants may be utilized to facilitate obtaining user credentials by a given conference client of a given user seeking to join a particular online conference/conference call/meeting.

One approach or variant for joining an MLS E2EE secure online conference may be referred to herein as the 'hash and fetch' variant in which a conference client and the conference server can operate, as follows:

The conference client maintains a cache of credentials it has seen in E2EE secure online conference (as discussed above);

When the conference client joins an E2EE secure online conference:

The conference server provides a list of hashes of user credentials that are being used in the online conference (i.e., for participants in the online conference);

For each hash of each user credential contained in the list obtained from the conference server, the conference client checks/compares each hash contained in the list against each of a corresponding hash of each user credential stored in its cached user credentials in order to determine whether it has a stored/cached user credential that matches a particular hash contained in the list obtained from the conference server:

If the conference client determines that it does have a stored/cached credential matching a particular hash of the list obtained from the conference server, the conference client uses the stored credential in the meeting; or If the conference client determines that it does not have a stored/cached credential for a particular hash of the list, the conference client downloads the user credential corresponding to the unmatched hash, validates the user credential, and adds the user credential to its cached list of user credentials in order to complete joining the E2EE secure online conference.

For the hash and fetch variant, fetching user credentials of unmatched hashes can be performed differently, depending on implementation. In at least one embodiment, each user credential for each unmatched hash can be fetched individually or can be fetched in a batch from the conference server or from another server. For example, user credentials may be downloaded from the main MLS conference server or from a different server.

In at least one embodiment, a Uniform Resource Locator (URL) or other identifying information can be included for one or more of the hashes of each user credential contained in the list obtained from the conference server. In at least one embodiment, credentials may be requested by hash or using a link (e.g., URL) provided by the conference server.

Generally, credential validation can involve querying an authentication service (AS) (not shown), to determine where a credential is valid. For example, for X.509 certificates, the AS can include a certificate chain per RFC 5280 that can be used to determine credential validity. Such validation can be used by a client to confirm the authenticity of a credential that is downloaded, before using the credential for MLS negotiations/operations.

Another approach or variant for joining an MLS E2EE secure online conference may be referred to herein as the 'compression dictionary' variant in which a conference client and the conference server can operate, as follows:

The conference client maintains a cache of credentials it has seen in E2EE secure online conference (as discussed above);

When the conference client joins an E2EE secure online conference:

The conference client includes in a request to the conference server an expression of the set of user credentials it has stored in its cache of user credentials. In at least one embodiment, the expression sent to the conference server may include a list of hashes of the user credentials stored/cached by the conference client;

The conference server compresses the list of user credentials in the meeting using the client's list of user credentials as a compression dictionary; and The conference server returns to the client a list of user credentials in the meeting, replacing the user credentials the conference client already knows (i.e., stored in its cached user credentials) with indices into the compression dictionary and providing any user credentials to the conference client that it does not already know (i.e., that are not stored in its cached user credentials.

Thus, as shown in FIG. 2 generally at 222, each conference client 204A, 204B, 204C, and 204D involved in the first online conference can request tree data/user credentials using either the hash and fetch interactions or the compression dictionary interactions, as discussed above. As generally shown at 230, the conference server 210 can provide/respond to a request with ratchet tree data including user credentials (potentially compressed as hashes of user credentials for the hash and fetch variant) to each conference client. Thus, the conference server 210 can store a ratchet tree/user credentials for each of one or more online conferences hosted by the conference server and can provide the ratchet tree/user credentials (optionally in a compressed form) to conference clients seeking to join an online conference. In the hash and fetch variant, a conference client can separately obtain any user credentials not already stored thereat, while in the compression dictionary variant, any user credentials not already stored thereat can be directly included in the ratchet tree data (along with indices of user credentials known by the conference client) sent to the conference client.

For example, for the first online conference, conference client 204A already has user credentials stored thereat for each of users 201B, 201C, and 201D and thus does not need to obtain any additional user credentials from the conference server. In contrast, conference client 204B is to obtain the user credential for user 201A (e.g., from the conference server 210 or from another server).

Similar operations may be performed by conference clients 204C, 204D, 204E, and 204F using either the hash and fetch or the compression dictionary operations/interactions with the conference server 210 for a second online conference (online conference 2) involving a ratchet tree 214-2 stored by the conference server 210.

In general, the hash and fetch variant may provide advantages in terms of reduced time to join an E2EE online conference and/or the amount of data uploaded/downloaded by each conference client when a majority of participants in a given online conference are already known to each conference participant (i.e., the user credentials of each participant are already cached by each conference client; whereas, the compression dictionary may provide advantages in terms of reduced time to join an E2EE online conference when the overlap of already known participants/user credentials is smaller.

Consider various examples that may illustrate how embodiments herein may reduce the amount of data that a conference client may need to download for joining/entering a given E2EE online conference. By reducing the amount of data that is to be downloaded, the speed of joining a given E2EE online conference that includes some overlap with participants of previous online conference(s) in which a given conference client/user has participated may thus be improved (take less time).

In one example, consider that a user, Alice, and 20 other users join a meeting. Alice's conference client can download all user credentials for the other 20 participants and can store/cache the 20 downloaded user credentials in a cached list of user credentials. Thereafter, the meeting can end, yet Alice's conference client can maintain the cached list of user credentials for use in one or more subsequent meetings. For example, one day later, consider that Alice joins another meeting with 10 of the participants from the previous call. For an implementation involving the hash and fetch embodiment, the conference server can provide Alice's conference client with a list of the 10 user credential hashes. In such an embodiment, Alice's conference client can recognize that all 10 hashes correspond to user credentials contained in the cached list of user credentials, so the conference client does not have to download any credentials.

In another example, consider that a user, Bob, and 20 other users join a meeting. Bob's conference client can download all user credentials for the other 20 participants and can store/cache the 20 downloaded user credentials in a cached list of user credentials. Thereafter, the meeting can end, yet Bob's conference client can maintain the cached list of user credentials for use in one or more subsequent meetings. For example, one day later, consider that Bob joins another meeting with 10 of the participants from the previous call. For an implementation involving the compression dictionary embodiment, when Bob's conference client initially connects to the conference server, the conference client provides a list of the user credentials (or hashes thereof) cached by the conference client to the conference server. In such an embodiment, the conference server can determine that the conference client already knows the user credentials of the 10 participants (e.g., by comparing user credentials (or hashes thereof) of the ratchet tree for the current call to the list of user credentials (or hashes thereof) obtained from the conference server to determine known/unknown or cached/not cached user credentials of the conference server) and can and replaces the known 10 known credentials with index values of the credentials that were included in the list previously obtained from the conference client, so that Bob's conference client does not have to download any of the previously known/cached user credentials.

In another example, consider that Bob subsequently joins a group meeting of 40 people, including 20 coworkers with whom he meets regularly. In accordance with embodiments herein (using either the hash and fetch or the compression dictionary variant), because Bob has met with those 20 coworkers recently in another meeting, Bob's conference client does not need to download the user credentials of those 20 known coworkers, but only the remaining 20 participants, potentially cutting the user credential download time for the group meeting roughly in half.

In some embodiments, the hash and fetch approach and the compression dictionary approach may be combined into yet another approach. For example, starting with the compression dictionary variant, a given client may express the list of credentials it has cached as a Bloom filter, a conference server may indicate known credentials by their hashes. Since Bloom filters can sometimes have false positives, the conference server may accidentally compress a user credential that a conference client does not already know. Thus, in some instances, a conference client may recover from this failure by using the hash to fetch the improperly compressed user credential, using interactions as discussed for the hash and fetch variant.

In various embodiments, user credentials cached at a given conference client may be cleared or otherwise deleted in-whole and/or in-part based on a variety of factors and/or configurations. For example, in various embodiments, a conference client can be configured to clear its cache of user credentials on a periodic basis (e.g., once a week, once every 'X' number of hours), based on a user seeking to join an online conference from a new device (e.g., a user can have multiple devices, such as a laptop, a mobile phone, etc., each of which can configured with a corresponding conference client for joining online conferences), based on a trigger received from a conference server (e.g., the server indicating to the conference client to clear its cache of user credentials), based on one or more conditions/criteria (e.g., a user credential for a particular user being updated/expiring/etc., based on the number of cached user credentials exceeding a threshold number [e.g., older user credentials could be 'rolled-off' or removed from the cache]), combinations thereof, and/or the like.

Referring to FIG. 3, FIG. 3 is a flow chart depicting a method 300 according to an example embodiment. In at least one embodiment, method 300 illustrates operations that may be performed by a conference client of a given user (e.g., any conference client discussed herein) and/or by a conference server (e.g., any conference server discussed herein) in order to facilitate joining E2EE encrypted meetings, according to an example embodiment.

As shown at 302, the method may include storing, by a conference client of a first user, one or more user credentials in a cached list of user credentials, wherein one or more user credential included in the cached list of user credentials corresponds to one or more other user for each of one or more previous online conferences (e.g., E2EE online conferences) in which the first user has (previously) participated.

At 304, the method may include, for a particular online conference to which the first user seeks to join, determining whether one or more particular user credentials for particular users participating in the particular online conference are not included in the cached list of user credentials (maintained by the conference client of the first user).

At 306, the method may include, based on determining that at least one particular user credential for the particular online conference is not identified in the cached list of user credentials, obtaining, by the conference client of the first user, the at least one particular user credential to enable the first user, via the conference client, to join the particular online conference.

The operations at 304 and 306 may be performed differently depending on whether the hash and fetch variant or the compression dictionary variant may be implemented for a given system deployment.

Figure 4:
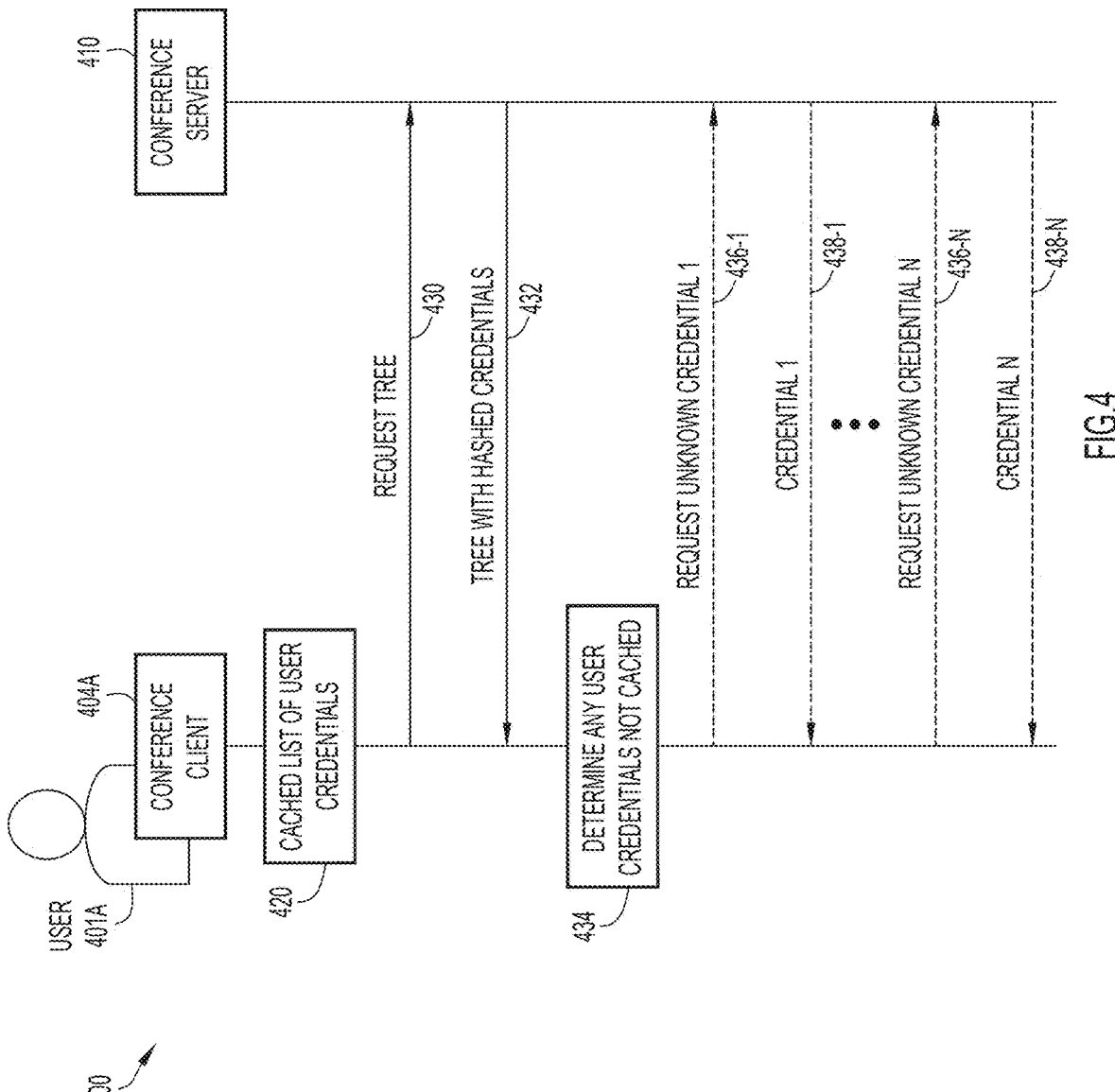
FIG. 4 is a message sequence diagram illustrating example operations for a hash and fetch approach for joining an E2EE online conference by a conference client of a user using cached user credentials, according to an example embodiment.

In one example, consider various example operations that may be performed by a conference client and a conference server in accordance with the hash and fetch embodiment for obtaining user credentials by the conference client for a given E2EE online conference to which a user of the conference client seeks to join as discussed with reference to FIG. 4, which is a message sequence diagram 400 illustrating example operations for the hash and fetch approach for joining the E2EE online conference, according to an example embodiment. FIG. 4 includes a conference client 404A associated with a user 401A. FIG. 4 also includes a conference server 410. A device of the user 401A upon which the conference client 404A can operate is not shown in FIG. 4 for purposes of brevity only in order to illustrate various features associated with embodiments herein.

As shown at 420, consider that conference client 404A maintains a cached list of user credentials in which each user credential included in the cached list of user credentials corresponds to each of one or more other users for each of one or more previous online conferences in which the user 401A has participated.

For joining a particular/current E2EE online conference hosted by the conference server 410, as shown at 430, the conference client 404A can send a network request to the conference server 410 requesting the ratchet tree/user credentials for the current E2WW online conference to which the user 401A seeks to join/enter. As shown at 432, the conference server 410 responds with the ratchet tree for the current online conference in which hashes of the user credentials for each participant in the online conference are included for the ratchet tree.

As shown at 434, the conference client 404A can compare the hashes of the user credentials obtained from the conference server 410 against (hashes of) the cached list of user credentials stored by the conference client 404A in order to determine whether there are any user credentials for participants of the current E2EE online conference that are not cached at the conference client 404A. It is understood that the conference client 404A knows/stores the user credential of the user 401A associated with the conference client 404A.

Upon determining any user credentials for the current online conference that are not stored/cached at the conference client 404A, the conference client 404A can fetch the corresponding (unknown/not cached) user credentials, for example, from the conference server, as generally shown at 436-1 and 438-1 thru 436-N and 438-N for any 'N' number user credentials not known/not cached at the conference client 404A. The fetching/downloading of user credential(s) performed by the conference client 404A can be performed individually for each unknown user credential, in a batch manner, using one or more network link(s) (e.g., URLs) contained in the ratchet tree data obtained from the conference server 410, combinations thereof, and/or the like in accordance with various embodiments herein.

The conference client 404A can use the combination of known/cached user credentials from previous E2EE online conference(s) and the newly obtained user credential(s) fetched for the current online conference in order to perform the MLS negotiations among the participants, per MLS standards, in order to complete joining/entering the E2EE online teleconference.

Figure 5:
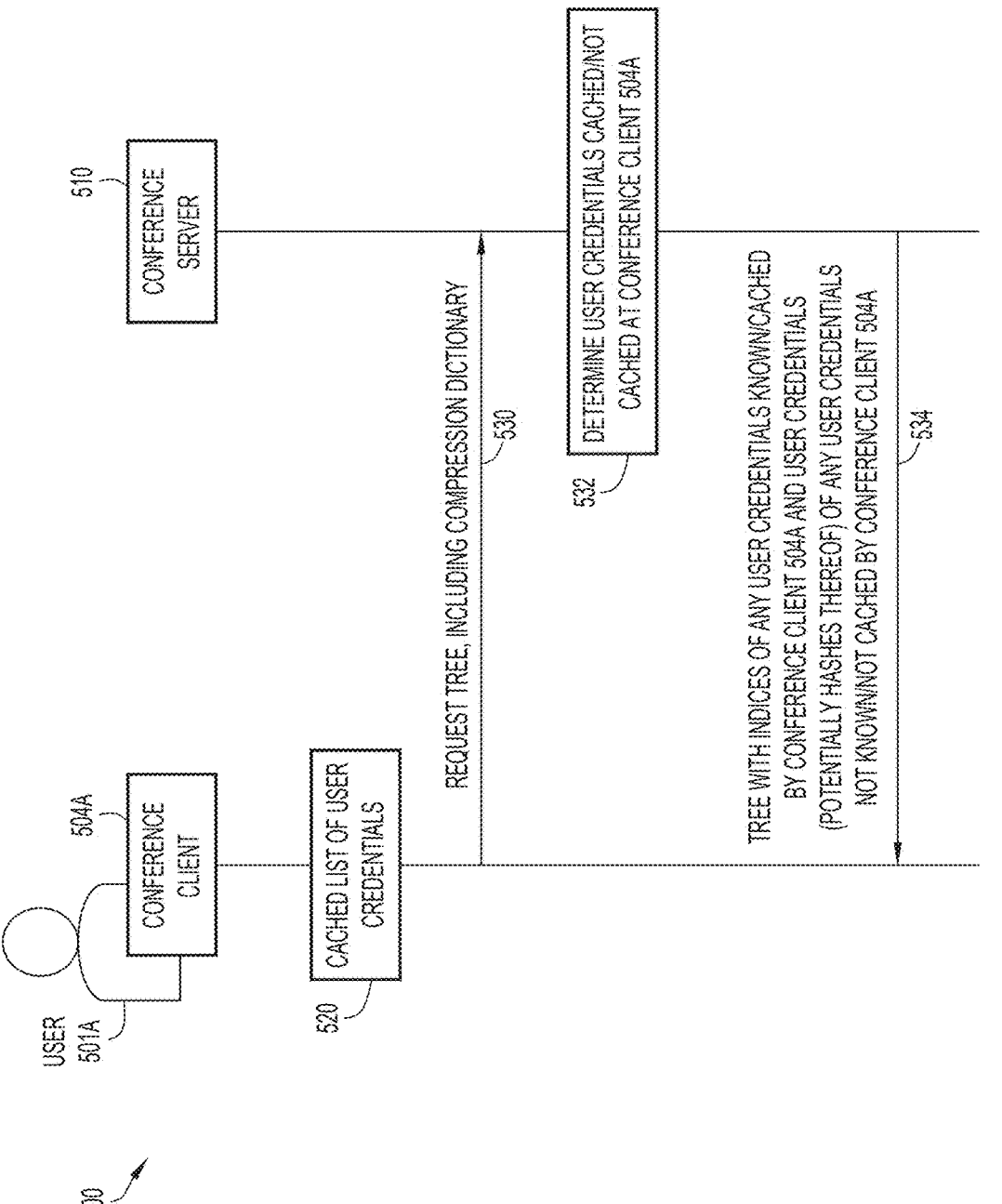
FIG. 5 is a message sequence diagram illustrating example operations for a compression dictionary approach for joining an E2EE online conference by a conference client of a user using cached user credentials, according to an example embodiment.

In another example, consider various example operations that may be performed by a conference client and a conference server in accordance with the compression dictionary embodiment for obtaining user credentials by the conference client for a given E2EE online conference to which a user of the conference client seeks to join as discussed with reference to FIG. 5, which is a message sequence diagram 500 illustrating example operations for the compression dictionary approach for joining the E2EE online conference, according to an example embodiment. FIG. 5 includes a conference client 504A associated with a user 501A. FIG. 5 also includes a conference server 510. A device of the user 501A upon which the conference client 504A can operate is not shown in FIG. 5 for purposes of brevity only in order to illustrate various features associated with embodiments herein.

As shown at 520, consider that conference client 504A maintains a cached list of user credentials in which each user credential included in the cached list of user credentials corresponds to each of one or more other users for each of one or more previous E2EE online conferences in which the user 501A has participated.

For joining a particular/current E2EE online conference hosted by the conference server 510, as shown at 530, the conference client 504A can send a network request to the conference server 510 requesting the ratchet tree/user credentials for the current E2EE online conference to which the user 501A seeks to join/enter. As shown at 530, the request can include a compression dictionary such as an ordered list of hashes of user credentials stored in the cached list of user credentials of the conference client 504A, as well as the user credential for the user 501A associated with the conference client 504A.

As shown at 532, the conference server 510 can compare the hashes of the user credentials obtained from the conference client 504A in the compression dictionary against (hashes of) the list of user credentials included in the ratchet tree for the current E2EE online conference in order to determine whether there are any user credentials for participants of the current online conference that are not known/cached at the conference client 504A.

Upon determining, by the conference server 510, user credentials known and/or unknown (i.e., cached and/or not cached) at the conference client 504A, the conference server 510 can construct/generate a ratchet tree for the current E2EE online conference to be sent to the conference client 504A in a manner such that, for any user credential(s) determined (based on the comparison) to be known/cached by the conference client 504A, the conference server 510 can include an index value in the ratchet tree that corresponds to an index of the known user credential as was identified in the ordered list of hashed user credentials of the compression dictionary obtained from the conference client 504A. For any corresponding user credential(s) determined to be unknown/not cached by the conference client 504A, the conference server can include the corresponding user credential(s) in the ratchet tree. As shown at 534, the conference server 510 can send the generated ratchet tree to the conference client 504A (with indices of any user credential(s) known/cached by the conference client 504A and user credential(s) of any user credentials not known/not cached by the conference client 504A).

The conference client 504A can use the combination of known/cached user credentials from previous E2EE online conference(s) and the newly obtained user credential(s) in order to perform the MLS negotiations among the participants, per MLS standards, in order to complete joining/entering the E2EE online teleconference.

Consider other example details with reference to FIGS. 6A, 6C, and 6D, discussed below, that may illustrate features of embodiments herein that may facilitate reducing the amount of data (user credentials) that may be downloaded by a conference client 604A of a user (not shown) seeking to join at least one MLS E2EE online conference using cached user credentials that can be stored at the conference client 604A, thus facilitating a faster join time for entering an MLS E2EE online teleconference as compared to conventional interactions performed for entering such an online conference. A device of the user upon which the conference client 604A can operate is not shown in FIGS. 6A, 6C, and 6D for purposes of brevity only in order to illustrate various features associated with embodiments herein. Further, it is to be understood that the conference client 604A also stores the user credential of the user associated with the conference client 604A.

Figure 6A:
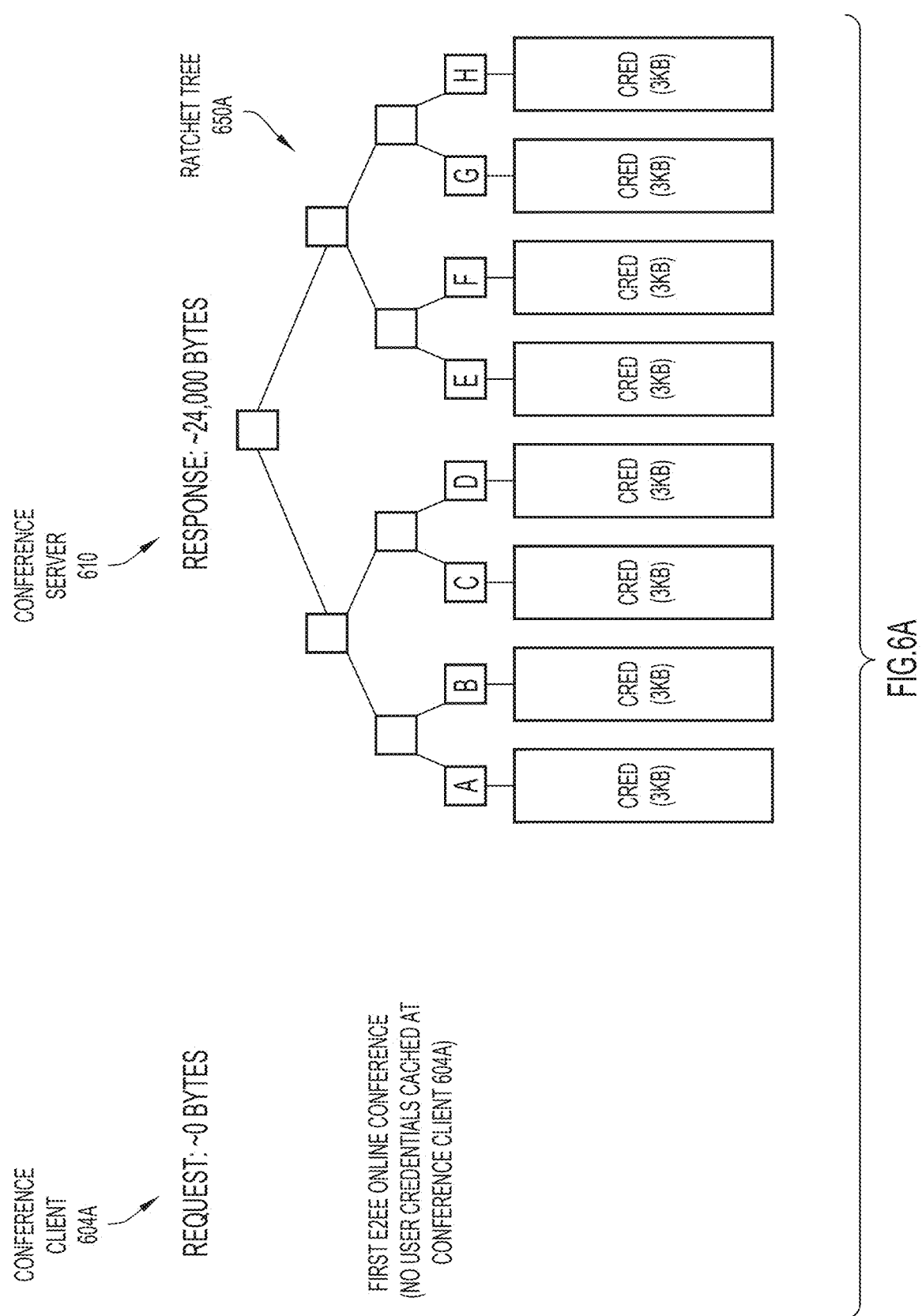
FIG. 6A is a diagram illustrating example details for joining a first E2EE online conference by a conference client of a user in accordance with the embodiments herein.

For example, FIG. 6A is a diagram illustrating example details for joining a first E2EE online conference by conference client 604A of the user (referred to as a user 'A') in accordance with the embodiments herein. FIG. 6A includes conference client 604A and a conference server 610. As shown in FIG. 6A, consider that the user seeks to join a first online conference including 7 other users (shown in FIG. 6A as users 'B', 'C', 'D', 'E', 'F', 'G', and 'H') for a total of 8 users in the online conference at a time when no user credentials have been cached at the conference client 604A (e.g., for a first online conference of the conference client 604A and/or after a condition/criteria/event/time period that caused the cache to be cleared).

As illustrated in FIG. 6A, consider that the conference client 604A requests the ratchet tree for the current E2EE online conference to which the user of the conference client 604A seeks to join. The size of the request sent by the conference client 604A may be minimal, such as a few bits or less than 1 byte (B) (e.g., near 0B).

The conference server 610 can respond to the request with a ratchet tree 650A for the E2EE online conference that includes a user credential for each of the users (including user 'A') in which the size of each user credential may be approximately 3 kilobytes (KB). It is to be understood the size of each user credential is provided for illustrative purposes only and is not meant to limit the broad scope of embodiments herein. Thus, the size of the response may be approximately 24,000 bytes [24 KB] (i.e., 3 KB×8 user credentials).

Consider after the first online conference ends that user 'A' via conference client 604A seeks to join a subsequent online conference that includes users, 'B', 'D', 'G', and 'H' that participated in the previous online conference of FIGS. 6A and 3 new users, 'J', 'K', and 'L' that did not participate in the previous online conference of FIG. 6A.

Figure 6B:
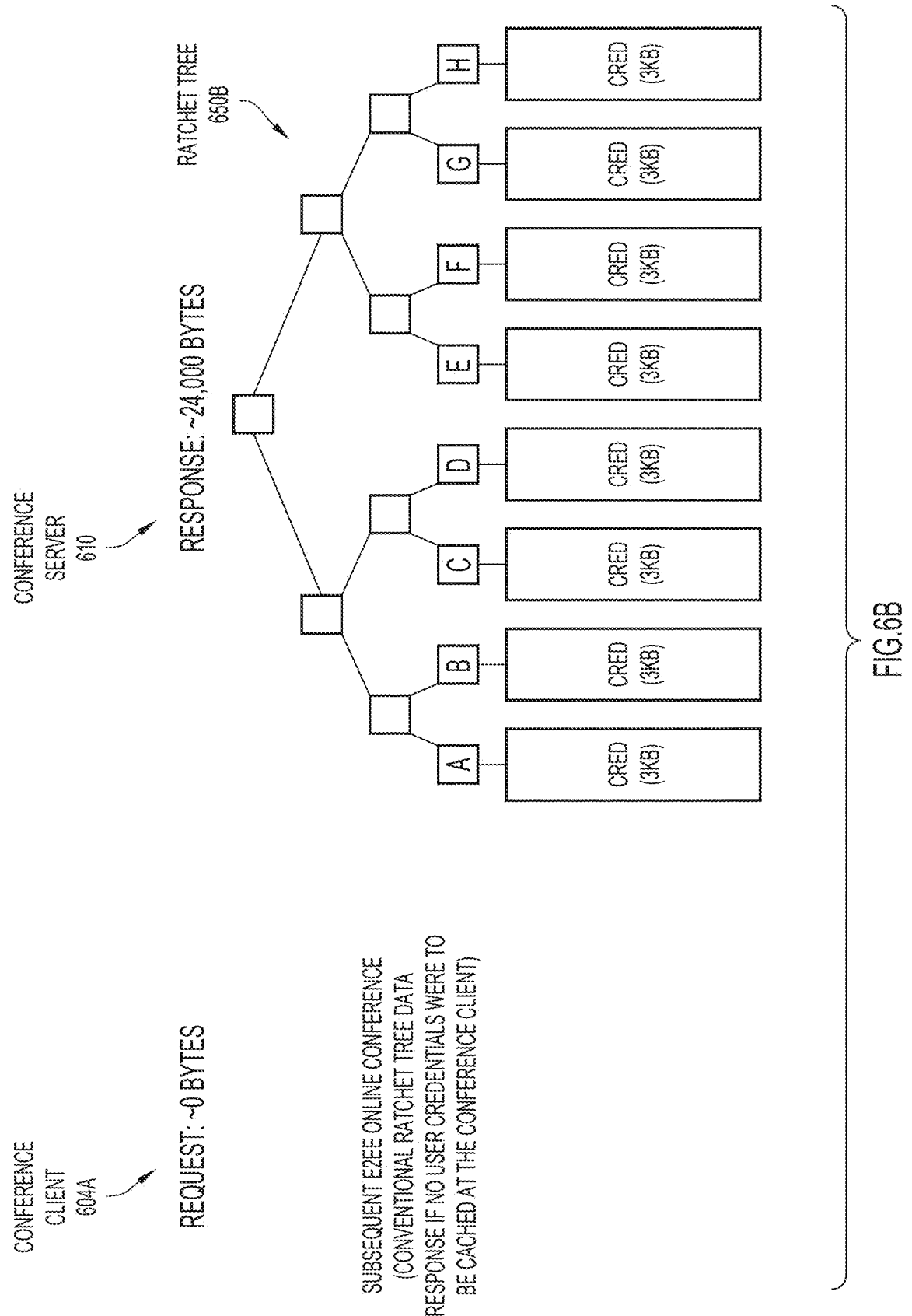
FIG. 6B is a diagram illustrating a conventional process for joining a subsequent E2EE online conference by conference client of FIG. 6A.

FIG. 6B is a diagram illustrating a conventional process for joining a subsequent E2EE online conference by the conference client 604A of FIG. 6A if no user credentials were to be cached at the conference client for any online conferences. For example, as shown in FIG. 6B, if no user credentials were to be cached by the conference client 604A, the conference client 604A would again download/receive each user credential of each participant of the subsequent online conference, or approximately 24,000 bytes [24 KB] of ratchet tree data (i.e., 3 KB×8 user credentials) for a ratchet tree 650B generated by the conference server 610.

However, in accordance with embodiments herein with reference to FIGS. 6C-1, 6C-2, and 6D, consider that conference client 604A does cache each of the user credentials for the other users that participated in the first E2EE online conference of FIG. 6A. For example, for FIGS. 6C-1, 6C-2, and 6D, consider that conference client 604A has a cached list of the user credentials for each of users 'B', 'C', 'D', 'E', 'F', 'G', and 'H' that were obtained for the first E2EE online conference of FIG. 6A. As noted above, it is to be understood that conference client 604A also knows/stores the user credential for the user 'A' of the conference client 604A.

Figures 1, 6C:
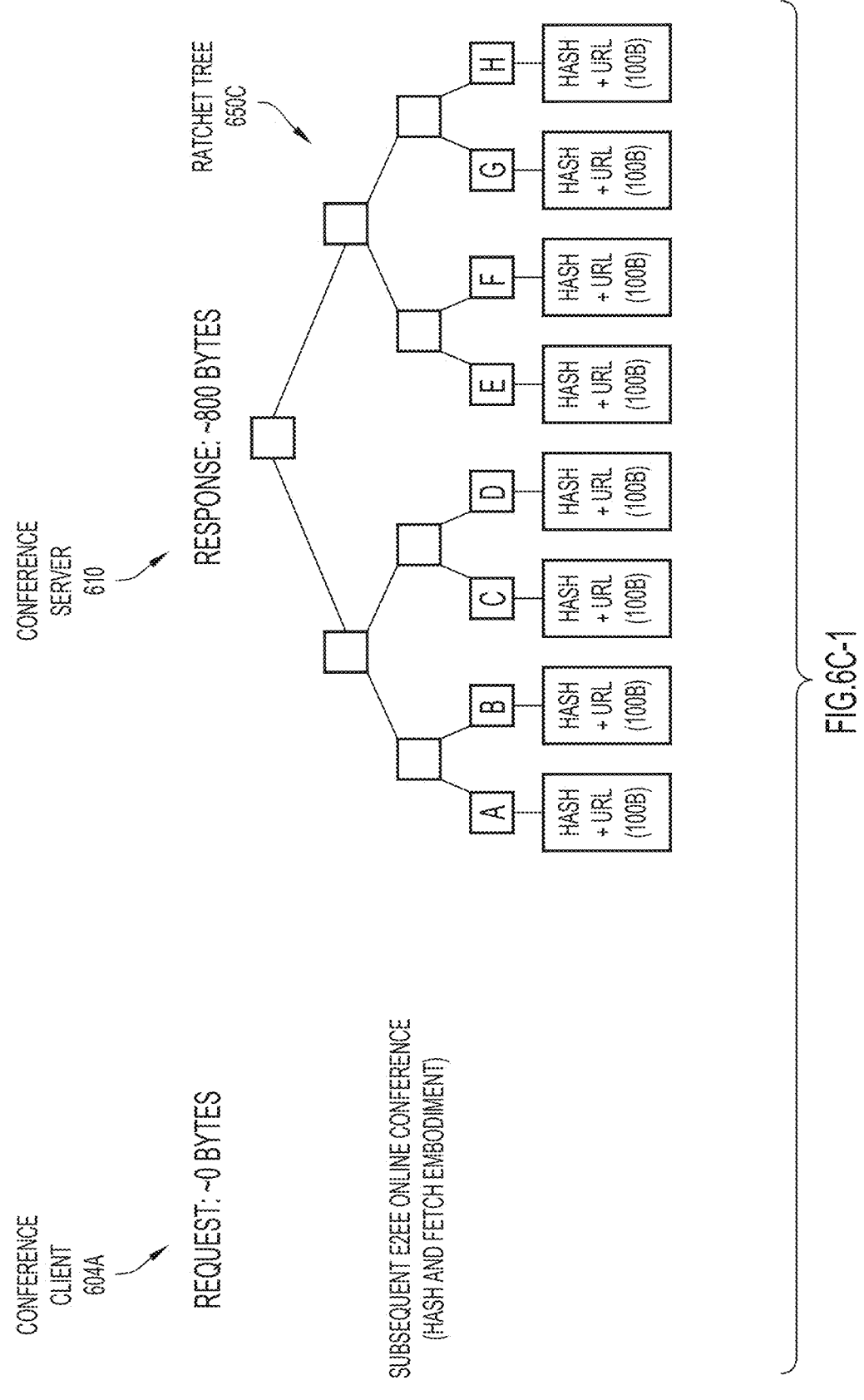
Figures 2, 6C:
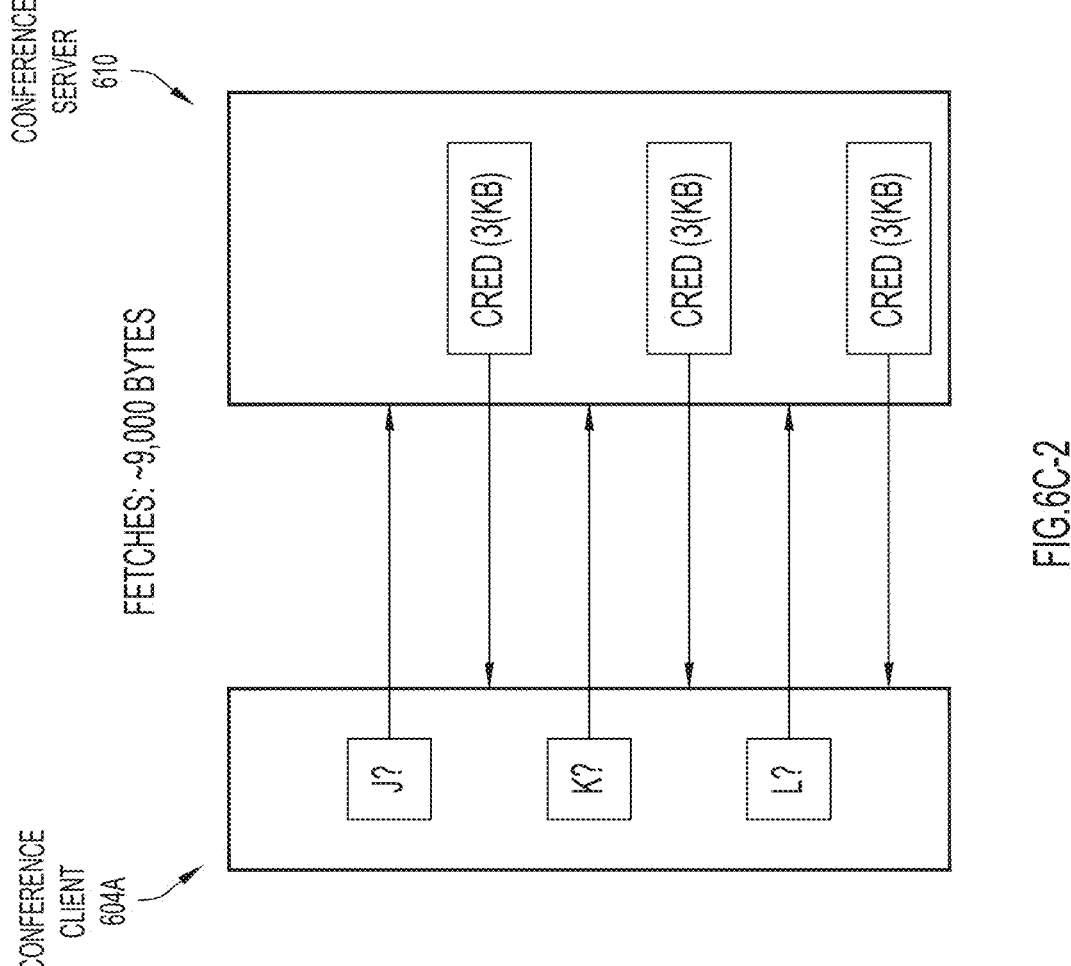

With reference to FIG. 6C-1 and FIG. 6C-2, FIGS. 6C-1 and 6C-2 are diagrams illustrating example process details for joining a subsequent E2EE online conference by the conference client 604A of FIG. 6A using the hash and fetch approach based on the cached list of user credentials stored by the conference client 604A for the other users that participated in the first E2EE online conference of FIG. 6A, according to an example embodiment.

As illustrated in FIG. 6C-1, consider that the conference server 610 (after receiving a request for the ratchet tree for the current E2EE online conference) generates a ratchet tree 650C for the current E2EE online conference that include a hash of each user credential of each of the users 'A', 'B', 'J', 'D', 'K', 'L', 'G' and 'H' and further includes, for each hash of each user credential, a link (e.g., a URL) for a network location/server from which the conference client 604A can fetch/download a given user credential, if needed (e.g., if not known to the conference client 604A).

As illustrated in FIG. 6C-1, consider that the approximate size of the hash of each user credential and the link is approximately 100 bytes (100B). Thus, the response from the conference server may be approximately 800 bytes for ratchet tree 650C. Upon receiving the ratchet tree 650C/hash of each user credential and link, the conference client 604A can compare the hash of each user credential obtained from the conference server 610 to a hash of each user credential contained in the cached list of user credentials stored by the conference client 604A from the previous online E2EE conference in which user 'A' participated.

Based on the comparison, the conference client 604A (in this example) can determine that the user credentials for each of users 'B', 'D', 'G', and 'H', are known to the conference client 604A, as those user's credentials were cached for the previous E2EE online conference of FIG. 6A. The conference client 604A can further determine that it does not have user credentials for each of users 'J', 'K', and 'L', which triggers the conference client 604A to initiate a download of corresponding (unknown) user credentials using the link included in the ratchet tree data obtained for each of users, 'J', 'K', and 'L', as illustrated in FIG. 6C-2.

As shown in FIG. 6C-2, the conference client 604A can download an additional 9000 bytes of user credential data through fetching the user credentials for each of users 'J', 'K', and 'L'. Thus, the hash and fetch approach may reduce the overall amount of user credential data downloaded for the subsequent E2EE online conference to approximately 9,100 bytes, as compared to the 24,000 bytes of user credential data to be downloaded (as shown in FIG. 6B) if no user credentials were cached thereat.

Accordingly, the hash and fetch approach utilized by the conference client 604A, performed based on user credentials cached at the conference client 604A from a previous E2EE online conference, may significantly reduce the amount of user credential data to be downloaded by the conference client 604A for joining a subsequent E2EE online conference, which can therefore speed up the time taken to join/enter a subsequent E2EE conference.

Figure 6D:
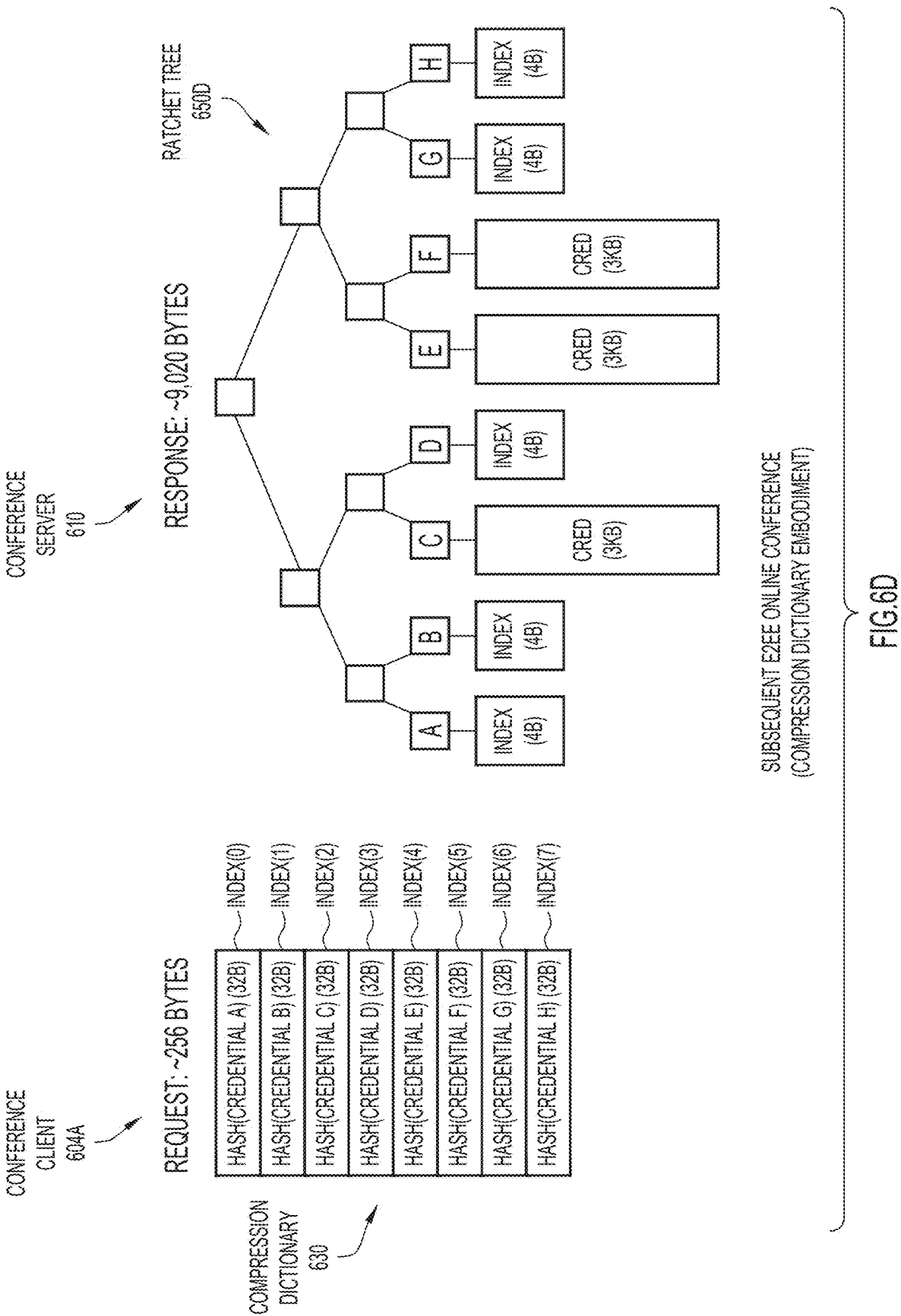
FIG. 6D is a diagram illustrating example details for joining a subsequent E2EE online conference by the conference client of FIG. 6A using a compressing dictionary approach, according to an example embodiment.

Moving to FIG. 6D, FIG. 6D is a diagram illustrating example process details for joining a subsequent E2EE online conference by the conference client 604A of FIG. 6A using the compression dictionary approach based on the cached list of user credentials stored by the conference client 604A for the other users that participated in the first E2EE online conference of FIG. 6A.

As shown in FIG. 6D, consider that for sending a request to the conference server 610 for joining the subsequent E2EE online conference, the conference client 604A generates and sends a compression dictionary 630 that includes an ordered list (e.g., starting from an index of 0 at the top of the list and increasing by an index value of 1 to the bottom of the list) of hashes of user credentials, including a hash of the user credential for user 'A' and also corresponding hashes of each corresponding user credential included in the cached list of user credentials maintained by the conference client. For FIG. 6D, the size of the hash of each user credential included in the compression dictionary 630 may be approximately 32 bytes, for approximately 256 bytes of user credential data included in the request sent to the conference server 610.

Upon receiving the compression dictionary 630, the conference server 610 compares the hashes of the user credentials obtained from the conference client 604A in the compression dictionary 630 against (hashes of) the list of user credentials included in the ratchet tree for the current E2EE online conference in order to determine whether there are any user credentials for participants of the current E2EE online conference that are not known/cached at the conference client 604A. For example, the conference server 610 can determine for the present example that the conference client 604A does not have a user credential for each of users 'J', 'K', and 'L' and does have a cached user credential for each of users 'B', 'D', 'G', and 'H'.

Upon determining, by the user credentials known and/or unknown (i.e., cached and/or not cached) at the conference client 604A, the conference server 610 can construct/generate a ratchet tree 650D to the current E2EE online conference to be sent to the conference client 604A that includes an index value of each user credential known/cached at the conference client 604A, such as index(0) for the user credential for user 'A' (that is implicitly known by the conference client 604A), index(1) for the user credential for user 'B' that is included in the cached list of user credentials of the conference client 604A, index(6) for the user credential for user 'G' that is included in the cached list of user credentials of the conference client 604A, and index(7) for the user credential for user 'H' that included in the cached list of user credentials of the conference client 604A. The ratchet tree 650D generated by the conference server 610 can also include a corresponding user credential for each of corresponding users 'J', 'K', and 'L'.

Each index value provided for each user credential known/cached by the conference client 604A may be approximately 4 bytes while the user credential provided for each user not known/not cached by the conference client 604A may be approximately 3 KB such that the size of the ratchet tree 650C/user credential data sent to the conference client may be approximately 9,020 bytes.

Accordingly, the compression dictionary approach utilized by the conference client 604A, performed based on user credentials cached at the conference client 604A from a previous E2EE online conference, may also significantly reduce the amount of user credential data to be downloaded by the conference client 604A for joining a subsequent E2EE online conference, which can therefore speed up the time taken to join/enter a subsequent E2EE conference.

Thus, embodiments herein may facilitate joining an E2EE online conference by a conference client of a particular user based on user credentials for other users that can be stored/cached by the conference client from past E2EE online conference(s) in a manner that may take less time as compared to conventional processes for joining an E2EE online conference that involve downloading user credentials for all users of the online conference each time such an online conference is joined/entered by a given user. As people typically meet with the same people often, embodiments herein may exploit this in order to reduce the amount of credential data that a meeting participant has to download, thus getting them into a meeting more quickly.

Figure 7:
FIG. 7 illustrates a hardware block diagram of a computing device configured to perform functions associated with operations discussed in connection with embodiments herein.

Referring to FIG. 7, FIG. 7 illustrates a hardware block diagram of a computing device 700 that may perform functions associated with operations discussed herein in connection with the techniques described for embodiments herein. In various embodiments, a computing device or apparatus, such as computing device 700 or any combination of computing devices 700, may be configured as any entity/entities in order to perform operations of the various techniques discussed for embodiments herein, such as any elements, functions, etc. discussed for embodiments herein.

In at least one embodiment, the computing device 700 may be any apparatus that may include one or more processor(s) 702, one or more memory element(s) 704, storage 706, a bus 708, one or more network processor unit(s) 730 interconnected with one or more network input/output (I/O) interface(s) 732, one or more I/O interface(s) 716, and control logic 720. In various embodiments, instructions associated with logic for computing device 700 can overlap in any manner and are not limited to the specific allocation of instructions and/or operations described herein.

For embodiments in which computing device 700 may be implemented as any device capable of wireless communications, computing device 700 may further include at least one baseband processor or modem 710, one or more radio RF transceiver(s) 712 (e.g., any combination of RF receiver(s) and RF transmitter(s)), one or more antenna(s) or antenna array(s) 714.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa) or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 730 may enable communication between computing device 700 and other systems, entities, etc., via network I/O interface(s) 732 (wired and/or wireless) to facilitate operations discussed for various embodiments described herein. In various embodiments, network processor unit(s) 730 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 732 can be configured as one or more Ethernet port(s), Fibre Channel ports, any other I/O port(s), and/or antenna(s)/ antenna array(s) now known or hereafter developed. Thus, the network processor unit(s) 730 and/or network I/O interface(s) 732 may include suitable interfaces for receiving, transmitting, and/or otherwise communicating data and/or information (wired and/or wirelessly) in a network environment.

I/O interface(s) 716 allow for input and output of data and/or information with other entities that may be connected to computing device 700. For example, I/O interface(s) 716 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 700 is implemented as a wireless device or any apparatus capable of wireless communications, the RF transceiver(s) 712 may perform RF transmission and RF reception of wireless signals via antenna(s)/antenna array(s) 714, and the baseband processor or modem 710 performs baseband modulation and demodulation, etc. associated with such signals to enable wireless communications for computing device 700.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may facilitate joining an encrypted meeting by a client device using cached credentials. In one form, a computer-implemented method is provided that may include storing, by a conference client of a first user, one or more user credentials in a cached list of user credentials, wherein one or more user credential included in the cached list of user credentials corresponds to one or more other user for each of one or more previous online conferences in which the first user has participated; for a particular online conference to which the first user seeks to join, determining whether one or more particular user credentials for particular users participating in the particular online conference are not included in the cached list of user credentials; and based on determining that at least one particular user credential for the particular online conference is not identified in the cached list of user credentials, obtaining, by the conference client of the first user, the at least one particular user credential to enable the first user, via the conference client, to join the particular online conference.

In at least one instance, the particular online conference is a Messaging Layer Security (MLS) protocol end-to-end encrypted online conference.

In one instance, the method may further include (e.g., for a hash and fetch embodiment), for the particular online conference to which the first user seeks to join, obtaining, by the conference client from a conference server for the particular online conference, each of a corresponding hash for each of a user credential for each of the particular users participating in the particular online conference. In one instance, the method may further include comparing, by the conference client of the first user, each corresponding hash for each of the user credential for each of the particular users participating in the particular online conference to each of a corresponding hash of each corresponding user credential included in the cached list of user credentials to determine whether one or more particular user credentials for the particular users participating in the particular online conference are not included in the cached list of user credentials. In one instance, based on determining that at least one particular user credential for the particular online conference is not identified in the cached list of user credentials, the obtaining includes requesting, by the conference client of the first user, the at least one particular user credential. In one instance, the conference client of the first user requests the at least one particular user credential from the conference server or from another server.

In one instance, for the particular online conference to which the first user seeks to join, the method may further include (e.g., for a compression dictionary embodiment) sending, by the conference client of the first user, at least a corresponding hash of each corresponding user credential included the cached list of user credentials to a conference server for the particular online conference. In at least one instance, the method may further include comparing, by the conference server, each corresponding hash of each corresponding user credential obtained from the conference client of the first user to each of a corresponding hash of each corresponding user credential for the particular users participating in the particular online conference to determine whether one or more particular user credentials for the particular users participating in the particular online conference are not included in the cached list of user credentials. In at least one instance, based on determining, by the conference server, that at least one particular user credential for the particular online conference is not identified in the cached list of user credentials, the obtaining includes obtaining the at least one particular user credential sent by the conference server to the conference client of the first user. In one instance, the method may include obtaining, from the conference server, one or more index values in which each index value identifies each of a corresponding user credential for the particular users participating in the particular online conference that are included in the cached list of user credentials.

In one instance, at least one user credential is stored in the cached list of user credentials is based on an external process. The external process can include one of storing in the cached list of user credentials the at least one user credential user based on a contact list of other users associated with the first user; or selecting the at least one user credential to add to the cached list of user credentials based on at least one other user being identified as a member of an organization of interest.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

storing, by a conference client of a first user, one or more user credentials in a cached list of user credentials, wherein one or more user credential included in the cached list of user credentials corresponds to one or more other user for each of one or more previous online conferences in which the first user has participated;

for a particular online conference to which the first user seeks to join, determining whether one or more particular user credentials for particular users participating in the particular online conference are not included in the cached list of user credentials;

based on determining that at least one particular user credential for the particular online conference is not identified in the cached list of user credentials, obtaining, by the conference client of the first user, the at least one particular user credential; and enabling the first user, via the conference client, to join the particular online conference using one or more of the at least one particular user credential or one or more other user credentials included in the cached list for the particular users participating in the particular online conference.

2. The method of claim 1, wherein the particular online conference is a Messaging Layer Security (MLS) protocol end-to-end encrypted online conference.

3. The method of claim 1, further comprising:

for the particular online conference to which the first user seeks to join, obtaining, by the conference client from a conference server for the particular online conference, each of a corresponding hash for each of a user credential for each of the particular users participating in the particular online conference.

4. The method of claim 3, further comprising:

comparing, by the conference client of the first user, each corresponding hash for each of the user credential for each of the particular users participating in the particular online conference to each of a corresponding hash of each corresponding user credential included in the cached list of user credentials to determine whether one or more particular user credentials for the particular users participating in the particular online conference are not included in the cached list of user credentials.

5. The method of claim 4, wherein based on determining that at least one particular user credential for the particular online conference is not identified in the cached list of user credentials, the obtaining includes requesting, by the conference client of the first user, the at least one particular user credential.

6. The method of claim 5, wherein the conference client of the first user requests the at least one particular user credential from the conference server or from another server.

7. The method of claim 1, further comprising:

for the particular online conference to which the first user seeks to join, sending, by the conference client of the first user, a corresponding hash of each corresponding user credential included the cached list of user credentials to a conference server for the particular online conference.

8. The method of claim 7, further comprising:

comparing, by the conference server, each corresponding hash of each corresponding user credential obtained from the conference client of the first user to each of a corresponding hash of each corresponding user credential for the particular users participating in the particular online conference to determine whether one or more particular user credentials for the particular users participating in the particular online conference are not included in the cached list of user credentials.

9. The method of claim 8, wherein based on determining, by the conference server, that at least one particular user credential for the particular online conference is not identified in the cached list of user credentials, the obtaining includes obtaining the at least one particular user credential sent by the conference server to the conference client of the first user.

10. The method of claim 9, further comprising:

obtaining, from the conference server, one or more index values in which each index value identifies each of a corresponding user credential for the particular users participating in the particular online conference that are included in the cached list of user credentials.

11. The method of claim 1, wherein at least one user credential is stored in the cached list of user credentials based on an external process.

12. The method of claim 11, wherein the external process includes at least one of:

storing in the cached list of user credentials the at least one user credential based on a contact list of other users associated with the first user; or selecting the at least one user credential to add to the cached list of user credentials based on at least one other user being identified as a member of an organization of interest.

13. One or more non-transitory computer readable storage media encoded with instructions that, when executed by a processor, cause the processor to perform operations, comprising:

storing, by a conference client of a first user, one or more user credentials in a cached list of user credentials, wherein one or more user credential included in the cached list of user credentials corresponds to one or more other user for each of one or more previous online conferences in which the first user has participated;

for a particular online conference to which the first user seeks to join, determining whether one or more particular user credentials for particular users participating in the particular online conference are not included in the cached list of user credentials;

based on determining that at least one particular user credential for the particular online conference is not identified in the cached list of user credentials, obtaining, by the conference client of the first user, the at least one particular user credential; and enabling the first user, via the conference client, to join the particular online conference using one or more of the at least one particular user credential or one or more other user credentials included in the cached list for the particular users participating in the particular online conference.

14. The media of claim 13, wherein the particular online conference is a Messaging Layer Security (MLS) protocol end-to-end encrypted online conference.

15. The media of claim 13, wherein the instructions, when executed by the processor, cause the processor to perform further operations, comprising:

for the particular online conference to which the first user seeks to join, obtaining, by the conference client from a conference server for the particular online conference, each of a corresponding hash for each of a user credential for each of the particular users participating in the particular online conference.

16. The media of claim 13, wherein the instructions, when executed by the processor, cause the processor to perform further operations, comprising:

for the particular online conference to which the first user seeks to join, sending, by the conference client of the first user, a corresponding hash of each corresponding user credential included the cached list of user credentials to a conference server for the particular online conference.

17. A system comprising:

at least one memory element for storing data; and at least one processor for executing instructions associated with the data, wherein executing the instructions causes the system to perform operations, comprising:

storing, by a conference client of a first user, one or more user credentials in a cached list of user credentials, wherein one or more user credential included in the cached list of user credentials corresponds to one or more other user for each of one or more previous online conferences in which the first user has participated;

for a particular online conference to which the first user seeks to join, determining whether one or more particular user credentials for particular users participating in the particular online conference are not included in the cached list of user credentials;

based on determining that at least one particular user credential for the particular online conference is not identified in the cached list of user credentials, obtaining, by the conference client of the first user, the at least one particular user credential; and enabling the first user, via the conference client, to join the particular online conference using one or more of the at least one particular user credential or one or more other user credentials included in the cached list for the particular users participating in the particular online conference.

18. The system of claim 17, wherein the particular online conference is a Messaging Layer Security (MLS) protocol end-to-end encrypted online conference.

19. The system of claim 17, wherein executing the causes the system to perform further operations, comprising:

for the particular online conference to which the first user seeks to join, obtaining, by the conference client from a conference server for the particular online conference, each of a corresponding hash for each of a user credential for each of the particular users participating in the particular online conference.

20. The system of claim 17, wherein executing the causes the system to perform further operations, comprising:

for the particular online conference to which the first user seeks to join, sending, by the conference client of the first user, a corresponding hash of each corresponding user credential included the cached list of user credentials to a conference server for the particular online conference.

* * * * *